United States Patent
Fulton et al.

(10) Patent No.: US 7,574,704 B2
(45) Date of Patent: Aug. 11, 2009

(54) SYSTEM AND METHOD FOR FREQUENCY BASED LOOP REORGANIZATION

(75) Inventors: Mike Stephen Fulton, Maple Ridge (CA); Christopher B. Larsson, Hurley, NY (US); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/970,436

(22) Filed: Oct. 21, 2004

(65) Prior Publication Data

US 2006/0101441 A1    May 11, 2006

(51) Int. Cl.
*G06F 9/44* (2006.01)
*G06F 9/45* (2006.01)

(52) U.S. Cl. .......... 717/159; 717/128; 717/140; 717/150; 717/151; 717/158

(58) Field of Classification Search .......... None
See application file for complete search history.

(56) References Cited

U.S. PATENT DOCUMENTS

| | | | |
|---|---|---|---|
| 5,854,933 A | 12/1998 | Chang | 395/709 |
| 5,901,318 A | 5/1999 | Hsu | 395/709 |
| 6,038,398 A | 3/2000 | Schooler | 395/709 |
| 6,151,704 A | 11/2000 | Radigan | 717/9 |
| 6,292,934 B1 | 9/2001 | Davidson et al. | 717/4 |
| 6,668,312 B2 * | 12/2003 | Aubury | 711/170 |
| 6,938,249 B2 | 8/2005 | Roediger et al. | |
| 2003/0097652 A1 | 5/2003 | Roediger et al. | 717/160 |
| 2004/0025153 A1 | 2/2004 | Johnson et al. | 717/161 |
| 2004/0068718 A1 | 4/2004 | Cronquist et al. | 717/151 |
| 2004/0261067 A1 | 12/2004 | Komatsu et al. | |
| 2005/0010912 A1 * | 1/2005 | Adolphson et al. | 717/151 |

* cited by examiner

*Primary Examiner*—Chuck O Kendall
(74) *Attorney, Agent, or Firm*—Yee & Associates, P.C.; Libby Z. Handelsman (57) ABSTRACT

A system and method for reorganizing source code using frequency based instruction loop replication are provided. Code is reorganized based on the frequency of execution of blocks of the code so as to favor frequently executed blocks of code over rarely executed code with regard to subsequent optimizations. Frequently executed blocks of instructions are maintained within loop/switch statements and rarely executed blocks of instructions are removed from the loop/switch statements. The rarely executed blocks of instructions may be replicated after the loop/switch statement with a reference back to the loop/switch statement. In this way, when subsequent loop/switch statement optimizations are applied, the frequently executed blocks of instructions within the loop are more likely to benefit from such optimizations since the negative influence of the rarely executed blocks of instructions has been removed.

20 Claims, 4 Drawing Sheets

```
FIG. 5 for (i=start; i<end; ++i)
    {
    switch (arr[i])

case common-value1
        case common-value2
            .
            .
            .
        case common-valueN
            <common code>
            break;

case rare-value1
            <rare code>
            break;
            .
            .
            .
        case rare-valueM
            <rare code>
            break;
    }
```

FIG. 6

```
        ⋮
BBStart (block 1) (frequency F₁) (is in loop A)
Lookup
   X2i
      iXload arr[i]
         aiadd
            aload arr
            isub
               imul
                  iload i
                  xStride
               iconst-16
   common-value₁:    → block C
   common-value₂:    → block C
   ...
   common-valueₙ:    → block C
   rare-value₁:      → block R₁
   rare-value₂:      → block R₂
   ...
BBEnd (block 1)

BBStart (block 3) (frequency F₂) (is in loop A)
<code - possibly several basic blocks>
goto → block 4
BBEnd (block 3)

BBStart (block 4) (is in loop A)
istore i
   isub
      iload i
      iconst -1
ificmplt → block 1
   iload i
   iload end
BBEnd (block 4)

BBStart (block R₁) (frequency F_R1) (is in loop A)
<code - possibly several basic blocks>
goto → block 4
BBEnd (block R₁)

BBStart (block R₂) (frequency F_R2) (is in loop A)
<code - possibly several basic blocks>
goto → block 4
BBEnd (block R₂)
...
BBStart (block R_M (frequency F_RM) (is in loop A)
<code - possibly several basic blocks>
goto → block 4
BBEnd (block R_M)
```

FIG. 7

SYSTEM AND METHOD FOR FREQUENCY BASED LOOP REORGANIZATION

BACKGROUND OF THE INVENTION

1. Technical Field

The present invention is generally directed to an improved mechanism for optimizing computer code. More specifically, the present invention is directed to a system and method for reorganizing portions of source code based on frequency based loop replication in order to facilitate optimizations during recompilation of computer source code.

2. Description of Related Art

In source code, instruction loops that have conditional logic in them, with a subset of the conditions dominating the execution path, are commonly found. For example, parser code, e.g., Extensible Markup Language (XML) parsers and compiler parsers, often includes such instruction loops. Much work has been performed with regard to optimizing such instructions loops.

Known proposed solutions today are to re-write sections of code in assembler language or to use a co-processor to manage a finite state machine representing the various states of the instruction loop(s). Rewriting code in assembler language is typically not done because of the enormous cost to the development team to develop and maintain this code. Co-processors typically require too much startup time and thus, provide a lesser overall benefit if the instructions being looped over is short.

Since such instructions loops include both blocks of code that are often executed and blocks of code that are rarely executed, optimizing the source code as is results in a less than optimum solution. That is, the same optimizations are applied to both the frequently executed blocks of code in the instruction loop and the blocks of code that are rarely executed. As a result, the "optimized" blocks of code that are often executed may not be fully optimized due to the optimizations performed on the rarely executed blocks of code. Similarly, optimizations are performed on rarely executed blocks of code which may not need to be optimized since they do not appreciably affect performance of the code.

Thus, it would be beneficial to have an improved system and method for optimizing instructions loops that have conditional logic in them, with a subset of the conditions dominating the execution path.

SUMMARY OF THE INVENTION

The present invention provides a system and method for reorganizing source code using frequency based instruction loop replication. The present invention reorganizes code based on the frequency of execution of blocks of the code so as to favor frequently executed blocks of code over rarely executed code with regard to subsequent optimizations.

With the present invention, portions of computer code that match one or more coding styles of interest, e.g., loops or switch statements that have a high frequency of execution and have both frequently executed and rarely executed blocks of instructions, are identified. Trace information for these portions of computer code are obtained from a trace profile to thereby identify one or more frequently executed blocks of instructions and one or more rarely executed blocks of instructions within the portion of the computer code.

Thereafter, the one or more rarely executed blocks of instructions are removed from the portion of computer code and appended to an end of the portion of computer code. For example, the rarely executed blocks of instructions are moved outside of the loop or switch instruction and are augmented with a reference back to the beginning of the loop/switch statement. As a result, only frequently executed blocks of instructions remain within the loop/switch statement Thus, the present invention maintains frequently executed blocks of instructions within the loop/switch statement and removes rarely executed blocks of instructions from the loop/switch statement. The rarely executed blocks of instructions may be replicated after the loop/switch statement with a reference back to the loop/switch statement. In this way, when subsequent loop/switch statement optimizations are applied, the frequently executed blocks of instructions within the loop are more likely to benefit from such optimizations since the negative influence of the rarely executed blocks of instructions has been removed.

These and other features and advantages will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
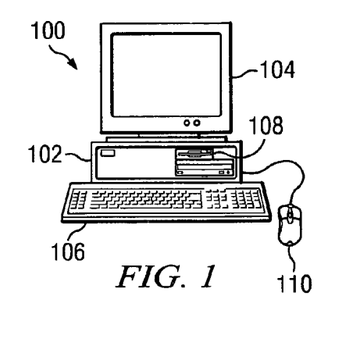
FIG. 1 is an exemplary diagram of a data processing system in which aspects of the present invention may be implemented.
Figure 2:
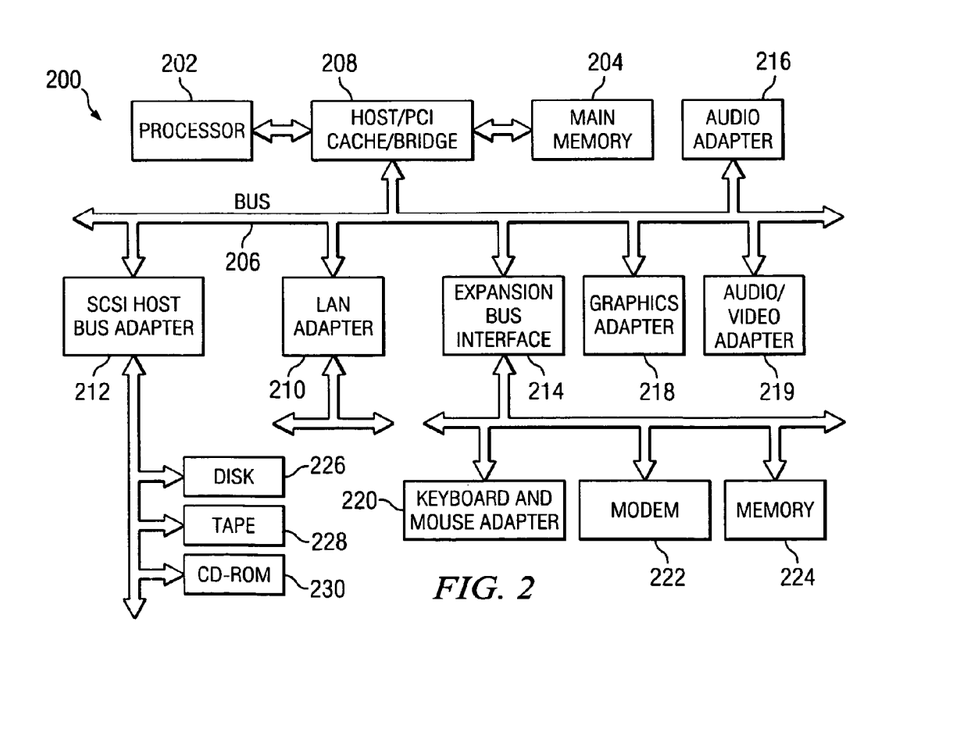
FIG. 2 is an exemplary block diagram of the primary operational components of a data processing system in which aspects of the present invention may be implemented.

The present invention provides a mechanism for reorganizing portions of source code using frequency based loop replication in order to facilitate optimizations during recompilation of computer source code. The present invention may be implemented in a variety of data processing systems including server and/or client computing devices in distributed data processing systems, such as the Internet, local area networks (LANs), wide area networks (WANs) intranets, and the like. In addition, the present invention may be implemented in a stand alone data processing system, such as a personal computer, workstation, client computing device, or the like. The following FIGS. 1 and 2 provide one example of a data processing system in which aspects of the present invention may be implemented. FIGS. 1 and 2 are only exemplary and are not intended to state or imply any limitation with regard to the particular configuration of data processing system that may be used to implement the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention, in one exemplary embodiment, may be performed by processor 202 using computer implemented instructions, which may be located in a memory such as, for example, main memory 204, memory 224, or in one or more peripheral devices 226-230.

As discussed above, the present invention is directed to a mechanism for reorganizing portions of source code based on frequency based loop replication in order to facilitated optimizations during recompilation of computer source code. The present invention is premised on the observation that many key loops in various portions of source code, such as source code in parsers, e.g., XML parsers and compiler parsers, manipulate data using particular coding styles that present compilers do not generate optimal code for. The present invention seeks to identify these coding styles in portions of source code and to reorganize these portions source code so that compiler optimizations may be applied to them. The reorganization is performed such that more frequently executed blocks of code are separated from rarely executed blocks so that the more frequently executed blocks of code are optimized by the compiler.

The identification of portions of the source code that include such coding styles and the frequency of execution of these portions is performed using execution tracing of the compiled source code. The source code is compiled with embedded hooks that cause trace information to be generated and written out to a trace profile. The trace profile is used by the present invention to identify the portions with coding styles of interest, the frequency of execution of these portions, and thereby, how to reorganize these portions of source code so that optimizations may be applied to frequently executed portions of source code having coding styles of interest.

Figure 3:
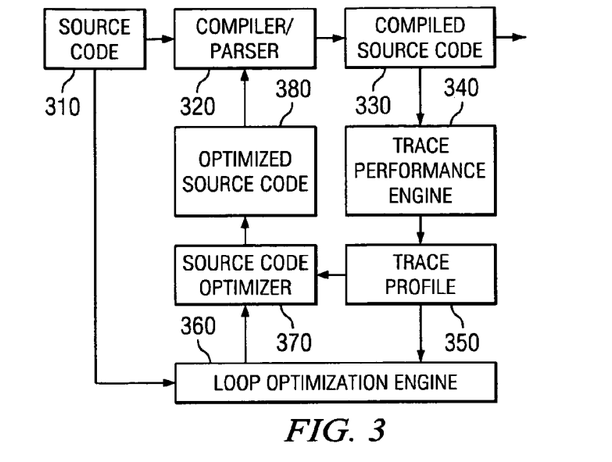
FIG. 3 is an exemplary diagram illustrating the interaction of the primary operational components of a source code compilation system in accordance with an exemplary embodiment of the present invention.

FIG. 3 is an exemplary diagram illustrating the interaction of the primary operational components of a source code compilation system in accordance with an exemplary embodiment of the present invention. As shown in FIG. 3, source code 310 is input to the compiler/parser 320 which parses and compiles the source code into compiled source code 330. The compiled source code 330 is executable code that includes trace hooks for use with trace performance engine 340. The trace performance engine 340 performs a trace of the execution of the compiled source code 330 and gathers information about the execution of the various portions of the compiled source code 330.

The trace information that is gathered by the trace performance engine 340 is stored in trace profile 350. The compilation, execution, and tracing of source code is generally known in the art. The present invention uses the information obtained from a trace of the execution of compiled source code to identify portions of source code that meet coding style requirements indicating portions of the source code that should be reorganized prior to optimization of the source code.

In one exemplary embodiment of the present invention, the trace performance engine 340 is part of a Java compiler, such as the International Business Machines (IBM) Java Just-in-Time (JIT) compiler. The IBM Java JIT compiler samples code as it is executed and, upon recompilation, block level frequency information is made available in the trace profile 350. This block level frequency information may be used to identify portions of code, i.e. blocks of instructions, which are frequently executed and rarely executed. This information is then used to determine if a coding style of a portion of code matches a coding style of interest. This coding style of interest is based on a predetermined pattern of coding including a predetermined pattern of coding frequently executed blocks of instructions and rarely executed blocks of instructions. In one exemplary embodiment of the present invention, the predetermined pattern of coding is a switch statement with frequently executed block(s) of instructions and rarely executed block(s) of instructions.

As shown in FIG. 3, the trace profile 350 is provided to the loop optimization engine 360 which identifies portions of the source code 310 that match coding styles of interest, e.g., predetermined patterns of coding involving frequently executed and rarely executed block(s) of instructions. As mentioned above, these coding styles of interest, in one exemplary embodiment, include switch statements having frequently executed and rarely executed block(s) of instructions.

The applicability of a traditional loop optimization depends almost solely on the code contained in that loop. Thus, optimizations that reduce the amount of code in a loop will increase opportunities for loop optimizations. The loop optimization engine 360 of the present invention transforms the code in loops of instructions in a manner that minimizes rarely executed code. In this way, the applicability of traditional loop optimizations is increased and the influence of the rarely executed code on such loop optimizations is reduced.

The loop optimization engine 360 transforms the code corresponding to a coding style of interest, e.g., an instruction loop or switch statement, into a different code sequence that is much easier to optimize using traditional loop optimization techniques. The loop optimization engine 360 receives the trace information from the trace profile 350 which identifies portions of code that are loops, switch statements, etc., as is generally known in the art. These loop/switch statement portions of code are then analyzed to determine if they match a coding style of interest.

In one exemplary embodiment, such analysis includes comparing the loop/switch statement portions of code to one or more coding style templates that identify the structure of a coding style of interest. These templates further define the coding style of interest in terms of the frequency of execution of portions of code, i.e. blocks of instructions. The loop optimization engine 360, based on the matching of the loop/switch statement portions of code to one or more of the coding style templates, reorganizes the loop/switch statement portion of code so that it changes the original loop/switch statement portion of code to be a nested loop where the inner loop in the nested loop contains the frequently executed code and the outer loop contains the rarely executed code from the original loop. That is, the reorganized loop/switch statement portion of code takes the form of a loop followed by code that is not considered part of the loop, but which branches back to the head of the loop again.

This transformation may be performed in a number of different ways. For example, the transformation may be based on a set of transformation rules established with the loop optimization engine 360 that are applied to the loop/switch statement portion of code in accordance with the way in which the loop/switch statement portion of code matches the one or more coding style templates. In one exemplary embodiment, a template mapping scheme where templates matched by the original loop/switch statement portion of code are associated with transformation templates that identify the way the original loop/switch portion of code is to be reorganized.

The loop optimized code is then provided to the source code optimizer 370 which applies traditional optimization techniques to the loop optimized code based on information stored in the trace profile 350. The application of traditional optimization techniques to source code is generally known in the art and thus, a detailed description will not be provided herein. The optimized source code 380 is then provided to the compiler/parser 320 which then compiles the optimized source code and outputs it for deployment or for further tracing.

Thus, the present invention provides a mechanism for reorganizing code associated with loops/switch statements such that frequently executed code is contained in a tight loop while rarely executed code is separated from the frequently executed code in such a manner that the rarely executed code is not considered part of the loop. This allows traditional loop optimization techniques to operate on the frequently executed code of the tight loop to fully optimize this portion of code. In this way, the rarely executed code does not negatively affect the optimization of the frequently executed code since it has been removed from the loop and appended to follow the loop of frequently executed code.

Figure 4:
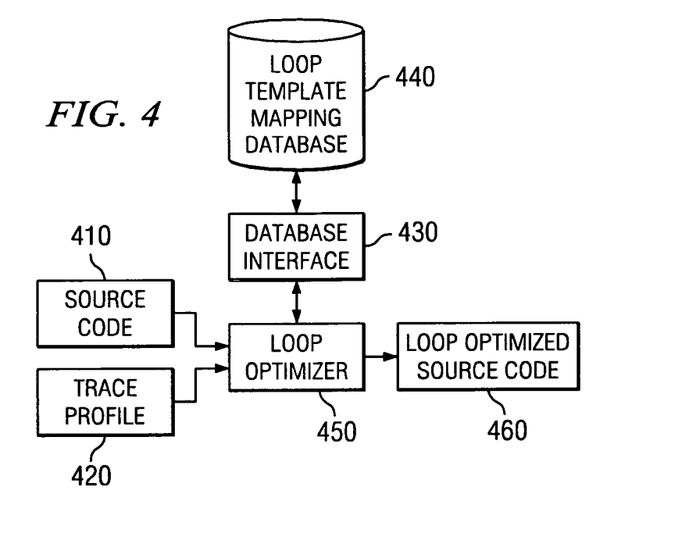
FIG. 4 is an exemplary block diagram of a loop optimization engine according to one exemplary embodiment of the present invention.

FIG. 4 is an exemplary block diagram of a loop optimization engine according to one exemplary embodiment of the present invention. As shown in FIG. 4, the loop optimization engine 400 includes a loop optimizer 450, a database interface 430, a loop template mapping database 440, and an input interface 455. The loop optimizer 450 receives source code 410 and trace profile information 420 via the input interface 455. The loop optimizer 450 then analyzes the loop/switch statement portions of the source code 410, based on the loop/switch statement identifiers and frequency of execution information in the trace profile 420, to identify those portions of the loop/switch statements that match coding styles of interest. These coding styles of interest are identified by coding style templates stored in the loop template mapping database 440 that is accessible via the database interface 430.

The loop optimizer 450 identifies those portions of the source code 410 that match one or more templates in the loop template mapping database 440 based on the frequency information obtained from the trace profile 420 and reorganizes these portions of source code so that rarely executed portions of the loops/switch statements are removed from the loops and appended following the loop. The loop then consists of the frequently executed code with the rarely executed code being appended after the loop but including a reference back to the beginning of the loop. This reorganization or transformation may be performed based on rules established in the logic of the loop optimizer 450, reorganization templates associated with the coding style templates in the loop template mapping database 440, or the like. The result is loop optimized source code 460 which may then be used to perform traditional loop optimizations on the reorganized loops/switch statements.

Figure 5:
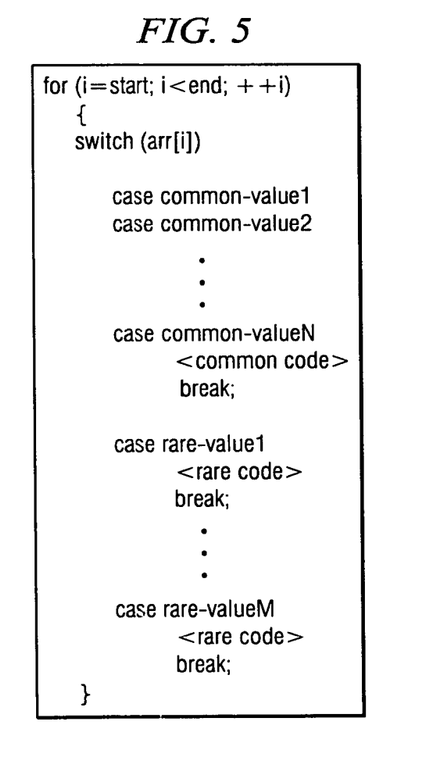
FIG. 5 is an exemplary diagram of a general form of an instruction loop that is optimized by operation of the present invention.

FIG. 5 is an exemplary diagram of a general form of an instruction loop that is optimized by operation of the present invention. As mentioned above, the present invention is directed to a mechanism for reorganizing source code that matches particular coding styles. In exemplary embodiments of the present invention, these coding styles are related to particular types of loops/switch statements. A general form of an instruction loop that may be optimized using the present invention is shown in FIG. 5.

As shown in FIG. 5, the loop contains a switch statement in which there are common and rare cases. As shown, the switch statement may include N number of common cases, i.e. frequently executed blocks of instructions, and M number of rare cases, i.e. rarely executed blocks of instructions. When identifying portions of source code matching such a coding style, cases are determined to be common or rare based on profile-directed-feedback. That is, blocks of instructions may be determined to be common or frequently executed based on a measure of the number of times that block of instructions is executed during a trace of the execution of the program and comparing the measure to a predetermined threshold. Similarly, rarely executed blocks of instructions may likewise be identified.

Figure 6:
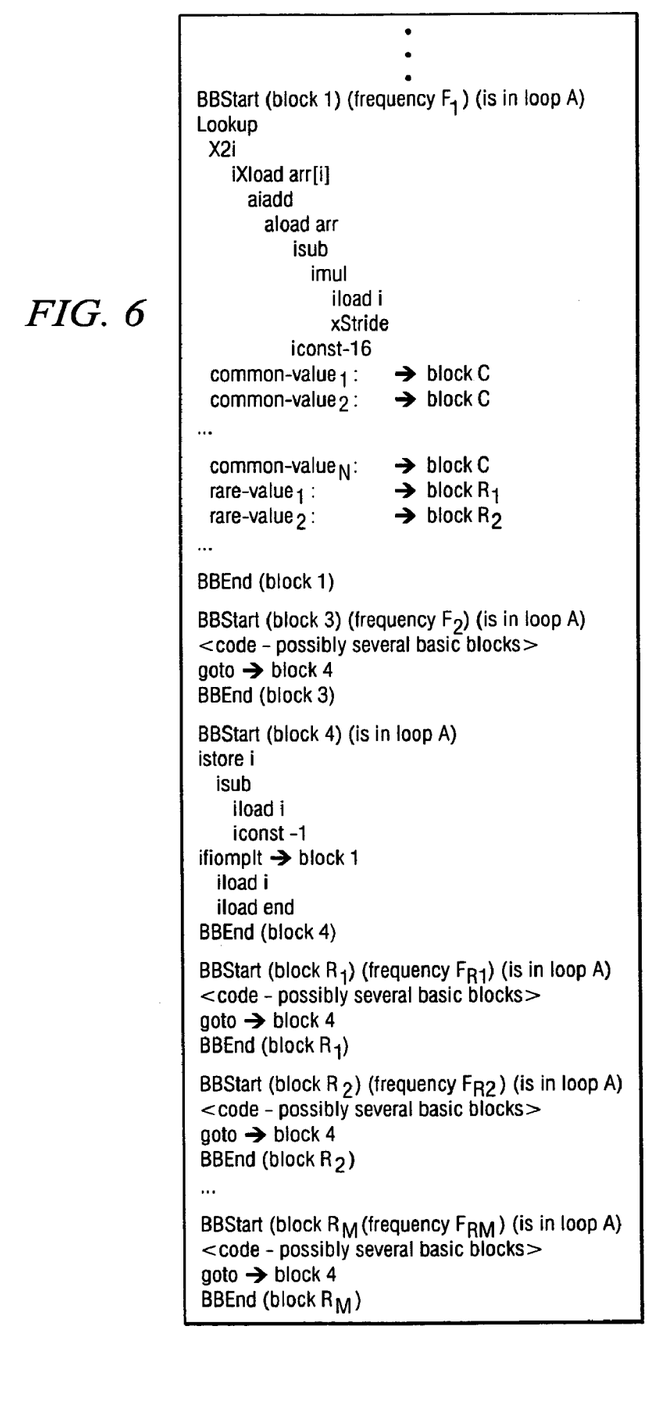
FIG. 6 is an exemplary diagram of an instruction loop template that may be used to identify instructions loops in source code that are to be optimized using the mechanisms of the present invention.

FIG. 6 is an exemplary diagram of an instruction loop template that may be used to identify instructions loops in source code that are to be optimized using the mechanisms of the present invention. FIG. 6 illustrates a tree representation of a more specific implementation of the general form shown in FIG. 5. In FIG. 6, "BBStart" and "BBEnd" indicate the start and end of a basic block, respectively. Basic blocks that are part of the loop are indicated with the phrase "(is in loop A)." The target common, i.e. frequently executed, block is called block C. The target rare blocks are called block $R_1$ through block $R_M$. The "lookup" instruction is an opcode that takes the following fields:

(1) integer indicating the value to lookup—in the depicted example, this is the expression arr[i] calculated by the aiadd sub-tree; and (2) target values and the basic block that should be branched to if it matches the specified value.

The rare blocks R1 . . . RM and rareBlockHeader are considered not to be part of the mainline execution.

Basic blocks have frequencies associated with them when they are being recompiled after profiling information is obtained. For the loop optimization of the present invention to be performed, the loop itself must be a high frequency loop and the common values must be significantly more frequent than the rare values.

Blocks of code are deemed to be significantly more frequent once it has been estimated how many times various blocks in the method executed in the past, i.e. during a trace of the execution of the code. An estimate for the number of times a block executed can be found by performing block frequency profiling which uses code added to each basic block that increments a block-specific counter every time the block is executed. Once the block execution frequency data is obtained for a period of time in these counters, this information may be used by the present invention to determine which blocks are executed more frequently in relation to other blocks. A threshold, e.g., 10-20%, may be used to classify blocks as frequently/rarely executed. The block with a maximum frequency of execution as determined from the profiling, is taken as the base for comparison. All blocks that have a frequency less than 10-20% of the maximum block frequency, for example, are deemed to be rarely executed.

For the depicted example, the $F_1$ frequency should be reasonably large, indicating the loop is "hot," the $F_2$ frequency should be reasonably close to $F_1$, and $F_{R1} \ldots F_{RM}$ should be reasonably small. A heuristic based on the target hardware architecture as well as the complexity of the common, i.e. frequently executed, and rare blocks may be used to determine the values for "reasonably large," "reasonably close," and "reasonably small."

The loop illustrated in FIG. 6 may be transformed into a loop followed by code not considered part of the loop, but which branches to the head of the loop again. As mentioned above, such a transformation is equivalent to changing the original loop to a nested loop where the inner loop in the nested loop contains the commonly executed, or frequently executed, code and the outer loop contains the rarely executed code. The transformation of the loop shown in FIG. 6 to a reorganized loop may be performed using rules established in the loop optimization engine, predetermined templates, or the like. In one preferred embodiment, an output instruction loop template that identifies the manner by which the loop is to be reorganized is used to restructure the loop to separate the frequently executed blocks of code from the rarely executed blocks of code.

Figure 7:
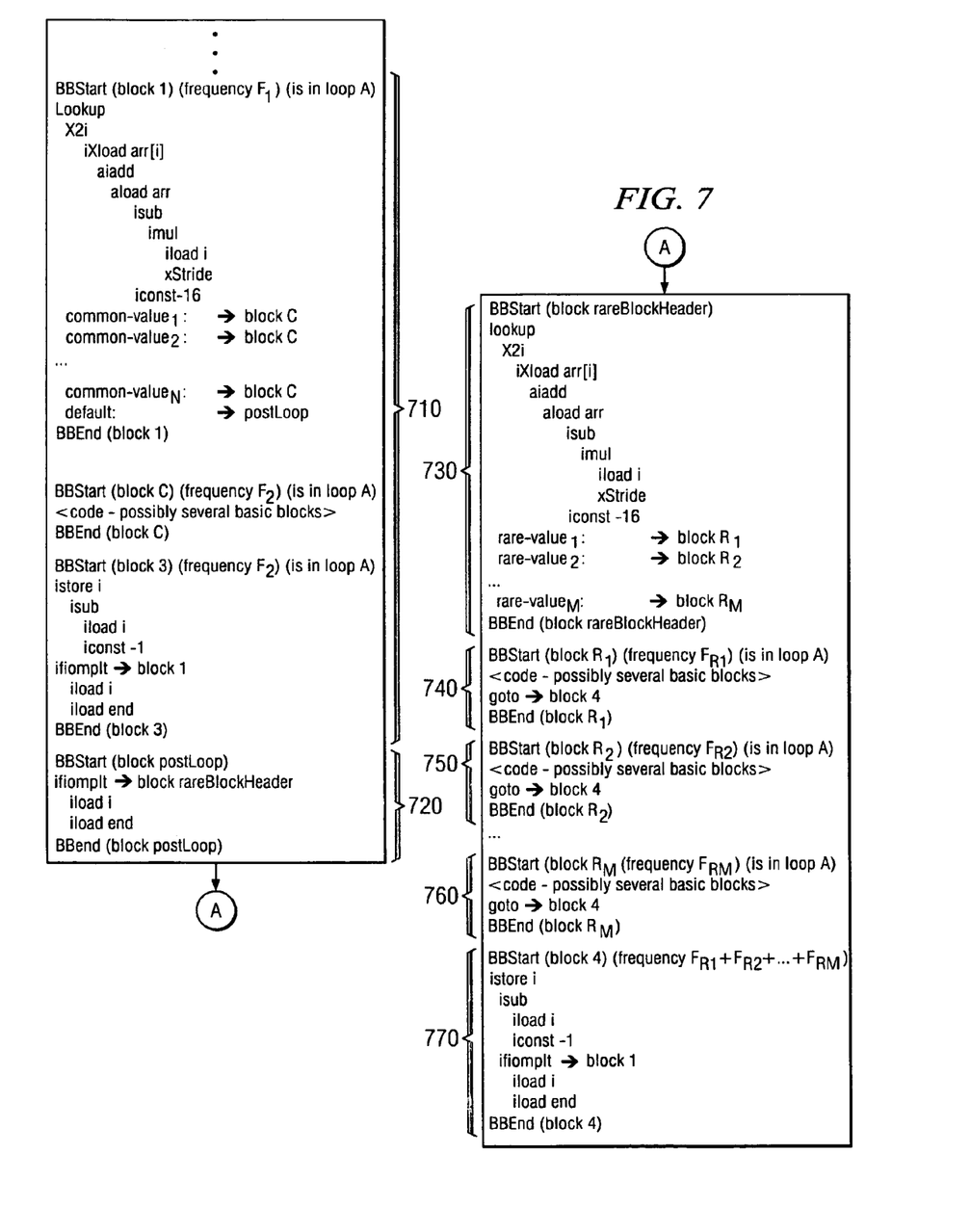
FIG. 7 is an exemplary diagram of an output instruction loop template into which an instruction loop identified using the template of FIG. 6 is transformed using the mechanisms of the present invention.

FIG. 7 is an exemplary diagram of an output instruction loop template into which an instruction loop identified using the template of FIG. 6 is transformed using the mechanisms of the present invention. As shown in FIG. 7 the high frequency code is contained in a tight loop 710. For cases where the high frequency code is simply walking through an array, such as array arr[i] in FIG. 7, skipping over elements, block C will be a simple goto block that will be eliminated in subsequent optimization phases.

The rarely executed blocks of instructions from the template shown in FIG. 6 are moved to a position after the frequently executed code loop 710. A "postLoop" block 720 is added for handling the default value in the main loop 710, i.e. when none of the common values are encountered. The "postLoop" block 720 branches to the rareBlockHeader block 730 which provides a mechanism for switching to one of the rarely executed blocks of instructions 740-760. Block 770 is a block of instructions that increments the variable "i", does a comparison with the value, and branches back to the start of the loop based on the outcome. This controls how long the outer loop created by loop replication is executed.

As shown in FIG. 7, the rarely executed blocks 740-760 do not merge with the high frequency code for a given iteration of the loop. Thus, any code (in the original loop) that was reachable starting from the merge point of the rare and frequent control flow paths (until the loop test, which signifies the end of an iteration for the loop) is replicated.

By moving the rarely executed code out of the loop, any stores/calls in the rare code no longer affect the invariance property, i.e. a property indicative of the likelihood of an expression to continue to have the same value through every iteration through a loop, of the other expressions in the tight loop. This opens up the possibility that the loop invariant code motion optimization, one of the traditional loop optimizations that may be applied following reorganization of the loop, will find more opportunities in the tight loop.

In addition, register assignment can be performed optimally since there are no rare blocks in the loop that will confuse register allocation. That is, register assignment is a complex part of code generation that a complier must perform. An attempt is usually made by the register assigner to hold a value in a register only as long as required by the instructions. A register's live range of instructions (defined as the rage of instructions where the register is holding onto a particular value) should therefore be minimized since a conservatively estimated live range that has too many instructions could result in higher register pressure causing register spills (register values being moved to memory so that the register can be used). Register spills are expensive in terms of speed performance since memory access are relatively slow. Therefore, a register assigner can estimate the live range of a register by count the number of blocks where it is required, the higher the number of blocks, the higher the likelihood of registers having to be spilled. Since frequency based loop replication of the present invention effectively removes rare blocks from the inner loop and moves them to the outer loop, the inner loop itself is more compact and has fewer blocks. Therefore the likelihood of register spills, as estimated by the assigner and very likely in the actual generate code, is lower in the frequently executed part of the loop.

Moreover, by moving the rarely executed code out of the loop, the loop can also be easily unrolled if block C is simple since there is no rare path code to complicate matters. That is loop unrolling is a technique when multiple iterations of a loop are executed in straight control flow (without any backward control flow). It is typically performed by duplicating the body of the loop. An important consideration when unrolling a loop is the growth in the code inside the loop. This can cause instruction cache misses since it takes more memory to accommodate the unrolled loop than the original loop. By reducing the size of the original loop, such as by moving the rarely executed paths as in the present invention, the loop unroller is permitted to be more aggressive on the smaller inner loop and unroll it more often.

It should be noted that while the above embodiments of the present invention have been described in terms of loops and switch statements that have rare paths and frequently executed paths, the present invention is not limited to such loops and switch statements. Rather, the present invention is equally applicable to other control flows containing rare/frequently executed paths. For example, the present invention may be applied to an if-then-else construct without departing from the spirit and scope of the present invention.

Figure 8:
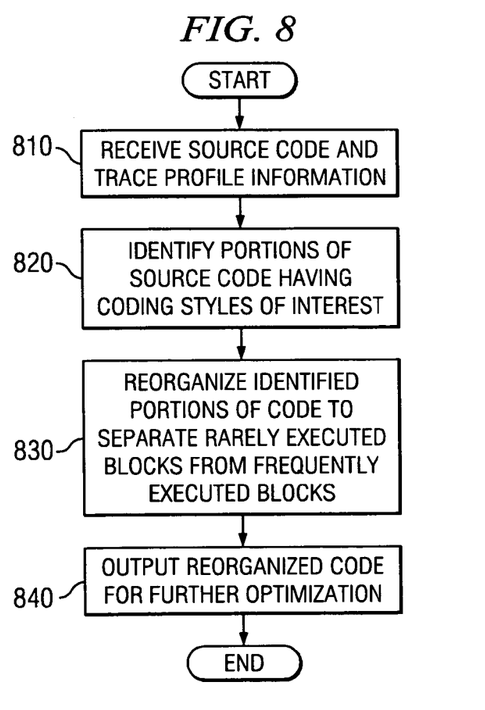
FIG. 8 is a flowchart outlining an exemplary operation of the present invention when optimizing an instruction loop in accordance with one exemplary embodiment of the present invention.

FIG. 8 is a flowchart outlining an exemplary operation of the present invention when optimizing an instruction loop in accordance with one exemplary embodiment of the present invention. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 8, the operation starts by receiving source code and trace profile information for an execution of the source code (step 810). Portions of the source code that have coding styles of interest are identified (step 820). As discussed above, in exemplary embodiments of the present invention these coding styles of interest are portions of loops/switch statements having frequently and rarely executed blocks of instructions. The identification of these portions of code may be performed using templates or rules and the frequency information and coding style identifiers provided in the trace profile information.

The identified portions of code having coding styles of interest are then reorganized so as to separate the rarely executed blocks of instructions from the frequently or commonly executed blocks of instructions (step 830). As discussed above, this process may involve removing the rarely executed blocks of instructions from the loop and appending them after the loop with a reference back to the start of the loop.

The reorganized code is then output for further optimizations (step 840). As discussed above, this may involve applying traditional loop optimizations to the reorganized code. For example, the loop invariant code motion optimization may be applied to the reorganized code such that the tight loop of frequently executed code is more likely to be fully optimized by such an application. Thereafter, the operation terminates.

Thus, the present invention provides a mechanism for reorganizing code based on the frequency of execution of blocks of the code so as to favor frequently executed blocks of code over rarely executed code with regard to subsequent optimizations. The present invention maintains frequently executed blocks of instructions in the loop/switch statement and removes rarely executed blocks of instructions from the loop/switch statement. The rarely executed blocks of instructions may be replicated after the loop/switch statement with a reference back to the loop/switch statement. In this way, when subsequent loop/switch statement optimizations are applied, the frequently executed blocks of instructions within the loop are more likely to benefit from such optimizations since the negative influence of the rarely executed blocks of instructions has been removed.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for reorganizing computer code so as to prepare the computer code for application of optimization techniques, comprising:

identifying a portion of the computer code that matches a coding style of interest, wherein the coding style of interest is one or more instruction loops that have a high frequency of execution and also have frequently executed blocks of instructions and rarely executed blocks of instructions;

identifying one or more of the frequently executed blocks of instructions and one or more of the rarely executed blocks of instructions within the one or more instruction loops that have a high frequency of execution;

removing the one or more of the rarely executed blocks of instructions from the portion of computer code; and appending the one or more of the rarely executed blocks of instructions to an end of the one or more instruction loops with a reference back to a beginning of the one or more instruction loops, wherein the one or more of the frequently executed blocks of instructions is maintained at the beginning of the one or more instruction loops to thereby generate reorganized computer code.

2. The method of claim 1, wherein the portion of computer code is one of an instruction loop and a switch statement.

3. The method of claim 1, further comprising:

obtaining trace information for an execution trace of the computer code, wherein identifying the one or more frequently executed blocks of instructions and one or more rarely executed blocks of instructions within the portion of the computer code includes using frequency of execution information in the trace information to identify the one or more of the frequently executed blocks of instructions and the one or more of the rarely executed blocks of instructions.

4. The method of claim 1, wherein identifying a portion of the computer code that matches a coding style of interest includes using a template identifying the coding style of interest.

5. The method of claim 3, wherein the one or more of the frequently executed blocks of instructions and the one or more of the rarely executed blocks of instructions are determined by comparing blocks of instructions to a predetermined threshold to measure frequency of execution.

6. The method of claim 1, wherein the method is implemented in association with a just-in-time compiler and wherein identifying the one or more of the frequently executed blocks of instructions and the one or more of the rarely executed blocks of instructions within the portion of the computer code includes obtaining execution frequency information from the just-in-time compiler.

7. The method of claim 1, further comprising:

applying one or more traditional optimization techniques to the reorganized computer code based on information stored in a trace profile associated with the computer code.

8. The method of claim 1, wherein the reorganized computer code includes an inner loop of frequently executed blocks of instructions and an outer loop of rarely executed blocks of instructions.

9. A computer program product in a recordable-type media for reorganizing computer code so as to prepare the computer code for application of optimization techniques, comprising:

instructions for identifying a portion of the computer code that matches a coding style of interest, wherein the coding style of interest is one or more instruction loops that have a high frequency of execution and also have frequently executed blocks of instructions and rarely executed blocks of instructions;

instructions for identifying one or more of the frequently executed blocks of instructions and one or more of the rarely executed blocks of instructions within the one or more instruction loops that have a high frequency of execution;

instructions for removing the one or more of the rarely executed blocks of instructions from the portion of computer code; and instructions for appending the one or more of the rarely executed blocks of instructions to an end of the one or more instruction loops with a reference back to a beginning of the one or more instruction loops, wherein the one or more of the frequently executed blocks of instructions is maintained at the beginning of the one or more instruction loops to thereby generate reorganized computer code.

10. The computer program product of claim 9, wherein the portion of computer code is one of an instruction loop and a switch statement.

11. The computer program product of claim 9, further comprising:

instructions for obtaining trace information for an execution trace of the computer code, wherein the instructions for identifying the one or more of the frequently executed blocks of instructions and the one or more of the rarely executed blocks of instructions within the portion of the computer code include instructions for using frequency of execution information in the trace information to identify the one or more of the frequently executed blocks of instructions and the one or more of the rarely executed blocks of instructions.

12. The computer program product of claim 9, wherein the instructions for identifying a portion of the computer code that matches a coding style of interest include instructions for using a template identifying the coding style of interest.

13. The computer program product of claim 11, wherein the one or more of the frequently executed blocks of instructions and the one or more of the rarely executed blocks of instructions are determined by comparing blocks of instructions to a predetermined threshold to measure frequency of execution.

14. The computer program product of claim 9, wherein the computer program product is executed in association with a just-in-time compiler and wherein the instructions for identifying the one or more of the frequently executed blocks of instructions and the one or more of the rarely executed blocks of instructions within the portion of the computer code include instructions for obtaining execution frequency information from the just-in-time compiler.

15. The computer program product of claim 9, further comprising:
  instructions for applying one or more traditional optimization techniques to the reorganized computer code based on information stored in a trace profile associated with the computer code.

16. The computer program product of claim 9, wherein the reorganized computer code includes an inner loop of frequently executed blocks of instructions and an outer loop of rarely executed blocks of instructions.

17. A system for reorganizing computer code so as to prepare the computer code for application of optimization techniques, comprising:
  a bus system;
  a memory connected to the bus system, wherein the memory includes computer usable program code; and
  a processor unit connected to the bus system, wherein the processing unit executes the computer usable program code to identify a portion of the computer code that matches a coding style of interest, wherein the coding style of interest is one or more instruction loops that have a high frequency of execution and also have frequently executed blocks of instructions and rarely executed blocks of instructions; identify one or more of the frequently executed blocks of instructions and one or more of the rarely executed blocks of instructions within the one or more instruction loops that have a high frequency of execution remove the one or more of the rarely executed blocks of instructions from the portion of computer code; and append the one or of the more rarely executed blocks of instructions to an end of the one or more instruction loops with a reference back to a beginning of the one or more instruction loops, wherein the one or more of the frequently executed blocks of instructions is maintained at the beginning of the one or more instruction loops to thereby generate reorganized computer code.

18. The system of claim 17, wherein the portion of computer code is one of an instruction loop and a switch statement.

19. The system of claim 17, wherein the processor unit further executes the computer usable program code to obtain trace information for an execution trace of the computer code, wherein the computer usable program code for identifying the one or more of the frequently executed blocks of instructions and the one or more of the rarely executed blocks of instructions within the portion of the computer code includes computer usable program code for using frequency of execution information in the trace information to identify the one or more of the frequently executed blocks of instructions and the one or more of the rarely executed blocks of instructions.

20. The system of claim 17, wherein the computer usable program code for identifying a portion of the computer code that matches a coding style of interest includes computer usable program code for using a template identifying the coding style of interest.

* * * * *